(12) United States Patent
Leser et al.

(10) Patent No.: US 7,784,262 B2
(45) Date of Patent: Aug. 31, 2010

(54) EXHAUST GAS GUIDE OF A GAS TURBINE AND METHOD FOR MIXING THE EXHAUST GAS OF THE GAS TURBINE

(75) Inventors: Stefan Leser, Toenisvorst (DE);
Michael Kaatz, Ratingen (DE);
Miroslav Podhorsky, Ratingen (DE)

(73) Assignee: Balcke Durr GmbH, Ratingen (DE)

( * ) Notice: Subject to any disclaimer, the term of this patent is extended or adjusted under 35 U.S.C. 154(b) by 934 days.

(21) Appl. No.: 11/508,167

(22) Filed: Aug. 23, 2006

(65) Prior Publication Data
US 2007/0044475 A1   Mar. 1, 2007

(30) Foreign Application Priority Data
Aug. 23, 2005   (EP)   ................... 05018270

(51) Int. Cl.
*F02C 7/08* (2006.01)
(52) U.S. Cl. .................... 60/39.182; 60/39.5
(58) Field of Classification Search ............. 60/39.182, 60/39.5; 122/7 R, 7 B
See application file for complete search history.

(56) References Cited

U.S. PATENT DOCUMENTS

| | | | | |
|---|---|---|---|---|
| 5,308,810 A * | 5/1994 | Voss et al. | ..................... | 502/28 |
| 5,461,853 A * | 10/1995 | Vetterick | ..................... | 60/783 |
| 5,946,901 A * | 9/1999 | Bauver et al. | ............ | 60/39.182 |
| 6,442,924 B1 * | 9/2002 | Talley et al. | ................... | 60/783 |
| 2004/0255592 A1 * | 12/2004 | Braun | ......................... | 60/772 |

FOREIGN PATENT DOCUMENTS

EP   0 638 732 A1   2/1995

* cited by examiner

*Primary Examiner*—Michael Cuff
*Assistant Examiner*—Vikansha S Dwivedi
(74) *Attorney, Agent, or Firm*—Baker & Hostetler LLP (57) ABSTRACT

The present invention relates to an exhaust gas guide of a gas turbine, which is situated between the gas turbine and a downstream waste heat boiler or a downstream gas diverter and which comprises a flow channel which has a cross-section expanding in at least some areas in the main flow direction, having installed surfaces influencing the flow. In order to achieve a more compact implementation of the exhaust gas guide and simultaneously avoid or reduce pressure losses, the installed surfaces are implemented as a swirl device generating a leading edge swirl, which is situated in the diverging area of the flow channel and is implemented to distribute the exhaust gas flow uniformly over the flow cross-sectional area upon entry into the waste heat boiler or the gas diverter. Furthermore, the present invention relates to a method for mixing the exhaust gas of a gas turbine with hot exhaust gas streams generated in an auxiliary firing of at least one burner. This thorough mixing is achieved by generating at least one leading edge swirl system in the flow channel.

15 Claims, 5 Drawing Sheets

EXHAUST GAS GUIDE OF A GAS TURBINE AND METHOD FOR MIXING THE EXHAUST GAS OF THE GAS TURBINE

CROSS-REFERENCE TO RELATED APPLICATIONS

This application claims priority to European Patent Application No. EP 05018270.8, filed Aug. 23, 2005, the disclosure of which is hereby incorporated by reference in its entirety.

FIELD OF THE INVENTION

The present invention relates to an exhaust gas guide of a gas turbine, which is situated between the gas turbine and a downstream waste heat boiler and which comprises a flow channel, which has a cross-section expanding in at least some areas in the main flow direction, having installed surfaces influencing the flow, and an exhaust gas guide of a gas turbine, which is situated between the gas turbine and a downstream gas diverter and which comprises a flow channel, which has a cross-section expanding in at least some areas in the main flow direction, having installed surfaces influencing the flow. Furthermore, the present invention relates to a method for mixing the exhaust gas of a gas turbine inside a flow channel which has a cross-section expanding in the main flow direction in at least some areas, with hot exhaust gas streams, which are generated by at least one burner situated in the flow channel.

Gas turbines are used, inter alia, in power plants, particularly in combined cycle gas turbine power plants (CCGT), for power production. In CCGT power plants, gas turbines and steam turbines are used in an overall facility for driving generators. The gas turbine generates current using a generator by combusting fossil fuels. The very hot exhaust gases arising are supplied to an exhaust gas guide and then conducted via a gas diverter or directly into a waste heat boiler. The waste heat boiler acts as a vaporizer and generates steam for driving the steam turbine using the hot exhaust gases of the gas turbine, which then in turn drives a further generator for the power generation.

BACKGROUND OF THE INVENTION

In general, it is desirable to implement CCGT power plants as compactly as possible. The compactness is strongly dependent on how long the exhaust gas guide between gas turbine exit and the entry into the waste heat boiler or into the gas diverter must be implemented. The cross-sectional area of the flow channel of the exhaust gas guide in the area of the gas turbine exit connecting piece is multiple times smaller than the cross-sectional area at the entry into the waste heat boiler or into the gas diverter. In the case of the waste heat boiler, this is because the heat-transmitting surfaces which the hot exhaust gas is to flow against in the waste heat boiler must be as large as possible to achieve good efficiency of the CCGT power plant. In the gas diverter as well, flow against a large area is desirable. Furthermore, it is desirable in both cases for the flow to be as uniform as possible over the entire channel cross-section.

SUMMARY OF THE INVENTION

Introducing guide sheets, deflection sheets, deflection gratings, or similar structures to generate turbulence as installed surfaces in the area of the expanding cross-section of the flow channel of the exhaust gas guide, in order to achieve application of the flow to the flow channel wall expanding in the main flow direction which is as constant as possible, is known. It is thus to be possible to implement the exhaust gas guide as short as possible and nonetheless obtain a relatively uniform flow upon entry into the waste heat boiler or into the gas diverter. However, constant application of the flow to the expanding flow wall, in particular with increasing opening angle of the flow channel, is only achieved in a limited way using the structures known up to this point. Furthermore, the known installed surfaces frequently cause high pressure losses and partially have only slight turbulence effects.

It is therefore the object of the present invention to improve the exhaust gas guide in such a way that it may be implemented as compact as possible and high pressure losses are simultaneously avoided.

This object is achieved by an exhaust gas guide of a gas turbine, which is situated between the gas turbine and a downstream waste heat boiler and which comprises a flow channel, which has a cross-section expanding in at least some areas in the main flow direction, having installed surfaces influencing the flow, and an exhaust gas guide of a gas turbine, which is situated between the gas turbine and a downstream gas diverter and which comprises a flow channel, which has a cross-section expanding in at least some areas in the main flow direction, having installed surfaces influencing the flow, and a method for mixing the exhaust gas of a gas turbine inside a flow channel which has a cross-section expanding in the main flow direction in at least some areas, with hot exhaust gas streams, which are generated by at least one burner situated in the flow channel.

Therefore, this is primarily an exhaust gas guide of a gas turbine known in principle, which comprises a flow channel, whose cross-section expands in at least some areas in the main flow direction and into which installed surfaces which influence the flow are introduced. Furthermore, a waste heat boiler or a gas diverter is connected downstream from the exhaust gas guide. The exhaust gas guide according to the present invention differs from the known exhaust gas guides in that the installed surfaces are implemented as a swirl device generating leading edge swirls, the swirl device being situated in the expanding cross-sectional area of the flow channel. Furthermore, the swirl device is implemented in such a way that the leading edge swirls generated thereby distribute the exhaust gas flow uniformly over the flow cross-sectional area upon entry into the waste heat boiler or the gas diverter.

The swirl device is an installed element known in principle, as has been described already for a diffuser in EP 0 638 732 A1, for example. The content of this publication is also viewed as applicable for the present invention through reference. The essential feature of this swirl device is that it generates leading edge swirls. These edge swirls, also referred to as swirl entraining, may be imagined as small tornadoes directed in the flow direction, whose diameters grow in the flow direction. The swirls first rotate outward from the lateral edges of the swirl device and then curl inward, through which diametrically opposite swirls rotate in opposite directions. If one looks downstream at a swirl device of this type, the leading edge swirls look like two snails curling in opposite directions.

These leading edge swirls have the advantage that they are extremely stable swirl systems, which result in especially effective mixing of the gas flow. Largely uniformly turbulent flow behavior is thus formed behind such a swirl device. Simultaneously, it is possible to orient the swirl device in such a way that the turbulent flow generated thereby is applied practically continuously to the flow channel wall expanding in the main flow direction. The flow channel cross-section may thus be expanded very strongly over a very short distance in the main flow direction, so that the exhaust gas guide may be implemented very compactly and nonetheless a flow distribution which is uniform over the flow cross-section is provided at the flow channel and upon entry into the waste heat boiler or into the gas diverter. The swirl device is thus intentionally oriented in such a way that uniform flow distribution over the flow channel cross-section occurs after the shortest possible flow distance. Simultaneously, practically no pressure losses are caused by the swirl device, since the swirl installed surface has a relatively low flow resistance. It does not act as a guide surface using its entire surface, but rather generates swirl fields using its leading edges which expand automatically in the flow direction without additional installed or guide surfaces being required for this expansion, and fill up the low-flow spaces in the channel. The overall pressure loss is thus reduced.

The opening angle at which the flow channel expands is preferably to be at least 30° or more. The steeper the opening angle, the more strongly the advantages of the installed surfaces generating the leading edge swirls are applied, because if typical installed surfaces which cause backup are used, strongly expanding channels may only have uniform flow through them with strong pressure losses. The exhaust gas guide according to the present invention results in especially compact constructions which nonetheless have low pressure losses precisely in new facilities. The swirl device is attached at a minimum interval in front of the end of the channel expansion. The minimum interval allows the leading edge swirls expanding like a bag to be able to be applied to the wall, which is placed downstream from the installed surface and is still expanding.

A further advantage of the present invention is that the largely uniformly turbulent flow behavior of the exhaust gas after the swirl device, which is caused by the leading edge swirls, is less strongly dependent on the gas quantity currently flowing through the flow channel than with the installed surfaces used up to this point. The swirl device therefore does not have to be continuously adapted to every variation of the gas quantity, when the output of the gas turbine is ramped up or down, for example.

Furthermore, situating burners in exhaust gas guides for auxiliary firing of the exhaust gas flow is known. The burners are frequently operated by fossil fuels, such as natural gas. This natural gas is combusted with the oxygen still contained in the exhaust gas in auxiliary firing. Through this auxiliary firing executed by the burners, the efficiency of a CCGT power plant may be elevated and the flow characteristic of the steam turbine may be tailored to the particular demand.

Burners of this type generate hot exhaust gas streams in the exhaust gas guide, which must be mixed with the remaining turbine exhaust gas before it flows into the waste heat boiler or the gas diverter. The known exhaust gas guides having burners in the flow channel have the disadvantage that the distance between burner and entry into the waste heat boiler or the gas diverter must be relatively large so the exhaust gas is completely mixed before leaving the exhaust gas guide.

In a preferred embodiment of the present invention, the swirl device is implemented and oriented in such a way that the leading edge swirls generated thereby mix the hot exhaust gas streams of the at least one burner with the remaining exhaust gas in a targeted way. The mixing of the hot exhaust gas streams with the remaining exhaust gas may thus be achieved over a relatively short distance, so that the interval between burners and waste heat boiler or gas diverter may be reduced, which in turn results in a more compact implementation of the exhaust gas guide overall.

In principle it is possible to situate the at least one burner upstream or downstream of the swirl device viewed in the main flow direction. It is also possible to situate the at least one burner next to the swirl device. The swirl device is preferably situated upstream from at least one burner, since the hot gas streams are thus engaged directly after they arise by the leading edge swirls already implemented, and the mixing distance required may thus be shortened further.

In a further preferred embodiment, the burner is situated in the area behind a face edge of the swirl device, i.e., in the area of the rear of the swirl device facing away from the supply flow of the exhaust gas flow. It is advantageous for this purpose that the relatively small volume flow of the hot exhaust gas streams is engaged by the leading edge swirls already produced of the greater volume flow of the remaining, colder exhaust gas and homogenization may be achieved over a very short mixing distance. Furthermore, it is especially advantageous if the burner is located in the area of the front half of the swirl device, since the hot exhaust gas jets are thus engaged by those swirl fields occurring early which are generated in the edge area of the swirl device furthest forward. The mixing distance may thus be shortened further.

Furthermore, multiple burners may be provided in the exhaust gas guide, the swirl device being implemented in such a way that the hot exhaust gas streams of all burners mix with the remaining exhaust gas and thus the exhaust gas flow is made uniform over the entire flow channel cross-section. The burners may be situated both next to one another and also one behind another viewed in the main flow direction.

In a further preferred embodiment, the leading edge swirls generated by the swirl device are oriented in such a way that the flow resulting therefrom has an essentially constant velocity, viewed over the flow cross-section, upon entry into the waste heat boiler or the gas diverter. This is advantageous since it contributes to the further optimization of the vaporization process in the waste heat boiler and/or to improving the gas flow guide in the gas diverter.

The exhaust gas flow coming out of the gas turbine not only has a high axial velocity in the main flow direction, but rather simultaneously has a twist around the main flow axis which results due to the flow and the expansion of the gases in the last blade rows of the turbine. This twist is a global twist, since the entire exhaust gas flow rotates around the main flow axis. It may reach a tangential velocity of 30 m/s and more. It is disadvantageous for this purpose that this global twist may generate oscillations in the waste heat boiler or the gas diverter which may result in damage.

In a further embodiment of the present invention, the swirl device is implemented in such a way that the leading edge swirl system generated by the swirl device counteracts the global twist of the exhaust gas flow, so that this is essentially eliminated before the exhaust gas flow enters the waste heat boiler or the gas diverter and the global tangential velocity is thus reduced almost to zero. The risk that the damage described above will occur is thus also significantly reduced.

A swirl device is to have at least one swirl disk. Such swirl disks may be implemented as circular, elliptical, rectangular, oval, paraboloid, rhomboid, or even triangular, for example, disks in linear or creased embodiments and/or also in triangular or drop-shaped cross-sectional embodiments being suitable.

In a refinement, a swirl device has multiple swirl disks situated neighboring one another in a flow cross-section. The swirl disks may be chained with one another or may also be individually attached to the wall. Swirl devices running like a chain around the entire cross-section may thus also be formed. This means that with a rectangular flow channel, for example, at least one swirl disk is situated in each case on the top, bottom, left, and right.

A swirl device preferably has multiple swirl disks situated in a cascade. A cascade is understood here as a functional sequence of swirl disks situated one behind another. These thus form a stepped image, an arrangement of the individual swirl disks offset at an incline or diagonally also being conceivable. It is only important that the gas flow is relayed from one swirl disk to the next, an optimum induction effect occurring.

The angle of attack of the swirl disk in relation to the main flow direction is expediently implemented as adjustable. Adaptation of the swirl device to the particular conditions of the gas guiding is possible through the adjustability of the angle of attack. Thus, for example, flow states during the startup of the gas turbine may be taken into consideration and the swirl disk may be set at a different angle in this startup phase then later during the operating phase of the gas turbine. The output of the waste heat boiler may also be optimized through the adjustability. If multiple swirl disks are provided, these may each be adjustable individually, independently of one another, or may be implemented as a swirl disk system which comprises multiple swirl disks situated on a common pivot axis, for example. Thus, multiple swirl disks may be changed jointly in their mode of operation through rotation or pivoting in a functional relationship to one another which is permanently defined.

According to the present invention, the object is also achieved by a method for mixing the exhaust gas of a gas turbine inside a flow channel, which has a cross-section expanding in the main flow direction in at least some areas, with hot exhaust gas streams that are generated by at least one burner situated in the flow channel, in that at least one leading edge swirl system is generated in the diverging area of the flow channel. The leading edge swirl system comprises two leading edge swirls rotating opposite to one another and inward in each case, the leading edge swirl system being generated by a swirl disk. The leading edge swirl system is to be oriented in such a way that it engages the hot exhaust gas streams of the at least one burner and thus causes mixing of these streams with the remaining exhaust gas over the shortest possible distance.

In a preferred refinement of the method according to the present invention, the leading edge swirl system is oriented in such a way that the global twist which the exhaust gas flow has upon leaving the gas turbine is essentially canceled out.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The present invention is explained further in the following on the basis of exemplary embodiments illustrated in the drawing. In the schematic figures.

DETAILED DESCRIPTION

In the embodiments described in the following, identical components are provided with identical reference numerals.

Figure 1:
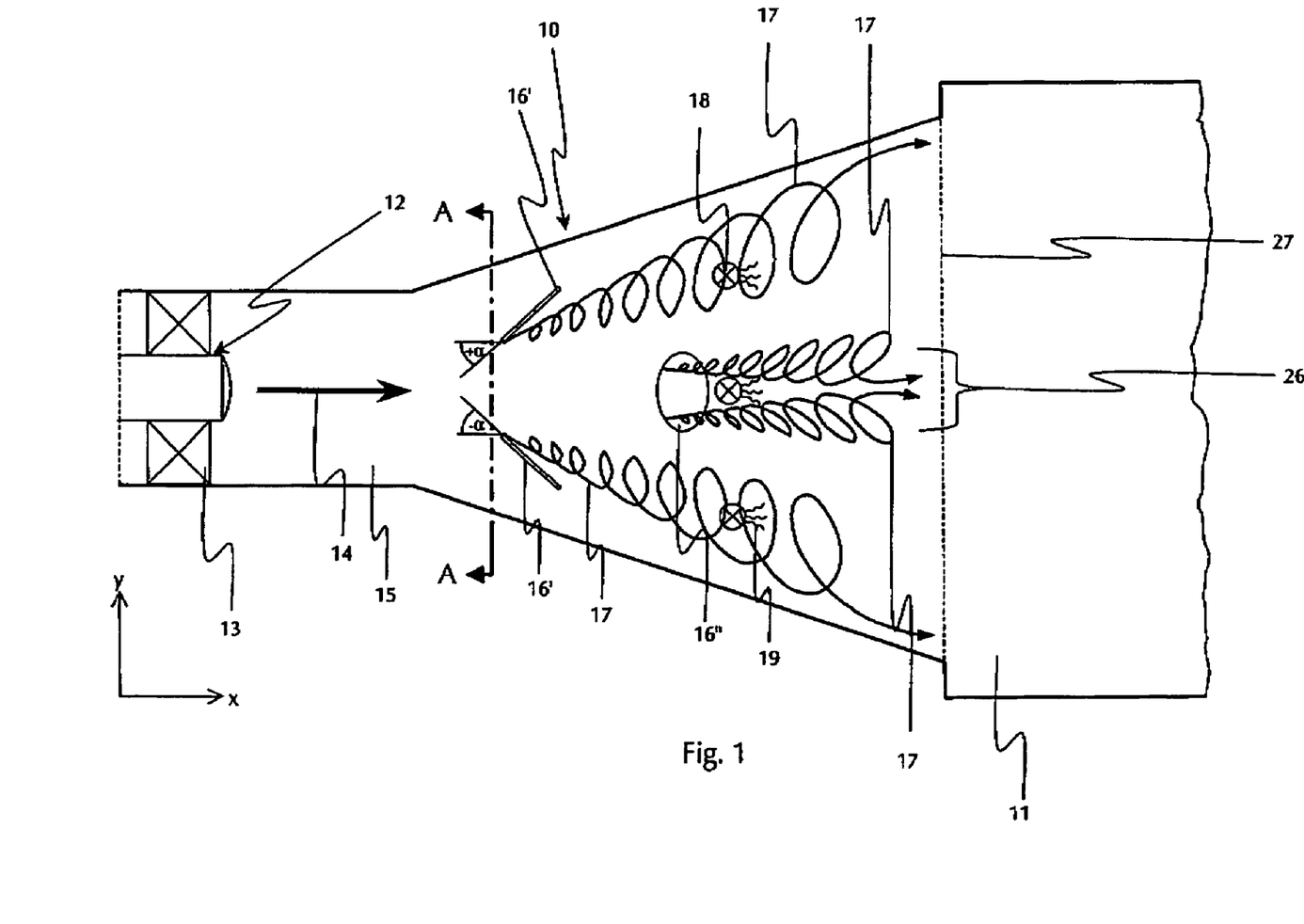
FIG. 1 shows a side view of an exhaust gas guide.

FIG. 1 shows an exhaust gas guide 10, which has a flow channel 15, which adjoins a gas turbine 12, which comprises blade wheels 13, and discharges into a waste heat boiler 11. The arrow identified by reference numeral 14 identifies the main flow direction of the exhaust gas of the turbine 12. In the exhaust gas guide 10 shown here, the main flow direction 14 runs in the direction of the flow channel longitudinal axis in the x direction. The flow channel 15 is implemented as rectangular and has walls running parallel in its forward area, which directly adjoins the gas turbine 12. In the further course of the flow channel 15, its cross-section expands both downward and also upward, the expansion having a constant slope both in the upper and also in the lower area and continuing up to the connection of the flow channel 15 to the waste heat boiler 11. In the upstream part of the diverging area of the flow channel 15, viewed in the main flow direction 14, two swirl disks 16' positioned one over another are provided. These swirl disks 16' are angled at an angle±α in relation to the main flow direction 14, the upper swirl disk 16' being angled at a positive angle α and the lower swirl disk 16' being angled at a negative angle α in relation to the main flow direction 14. Furthermore, the swirl disks 16' are situated axially symmetric to one another, the mirror axis running in the x direction. On their lee side facing away from the flow, they thus generate leading edge swirls 17, which spread out downstream expanding conically transversely to the main flow direction. The swirl disks 16' are oriented in such a way that the flow, due to the leading edge swirls generated thereby, is applied practically continuously to the expanding flow channel walls and no flow breakaway occurs. The leading edge swirls 17 form a leading edge swirl system 26 behind each swirl disk 16', this system being two swirls 17 rotating in opposite directions toward the middle of the swirl disks 16', which are very stable and powerful. Such a leading edge swirl system 26 is shown in FIG. 1 in connection with another swirl disk 16" positioned further downstream. The swirl disk 16" is situated transversely to the main flow direction 14 and angled at an axis running in the y direction, so that leading edge swirls 17 also arise on its lee side facing away from the flow. The swirl disks 16" is situated approximately in the middle between the two forward swirl disks 16' seen in the y direction. All swirl disks 16', 16" have a circular area and are implemented identically.

Further downstream, viewed in the main flow direction 14, three burners 18 are situated one on top of another along an axis running in the y direction. By combusting natural gas with the residual oxygen contained in the exhaust gas, these burners 18 generate hot exhaust gas streams 19, which flow downstream in the direction of the waste heat boiler 11. The swirl disks 16', 16" are oriented in such a way that the leading edge swirls 17 generated thereby engage the hot exhaust gas streams 19 of the burners 18 and mix them uniformly with the remaining exhaust gas over a relatively short distance. The middle burner 18 seen in the y direction is situated directly behind the swirl disk 16" in the area of its lee side facing away from the flow. The hot exhaust gas streams 19 of this burner are thus engaged even by the leading edge swirls 17 of the swirl disk 16" which have just arisen, through which the homogenization of the exhaust gas flow may occur over an especially short distance. The exhaust gas streams of the two burners closer to the flow channel edge are engaged by the leading edge swirl systems of the swirl disk 16' and thus also mixed with the exhaust gas flow. Through the front edge swirls 17 generated by the swirl disks 16', 16", the exhaust gas is distributed uniformly over the flow cross-section in the entry area 27 of the waste heat boiler 11 and the hot exhaust gas streams 19 are completely mixed with the remaining exhaust gas.

Figure 2:
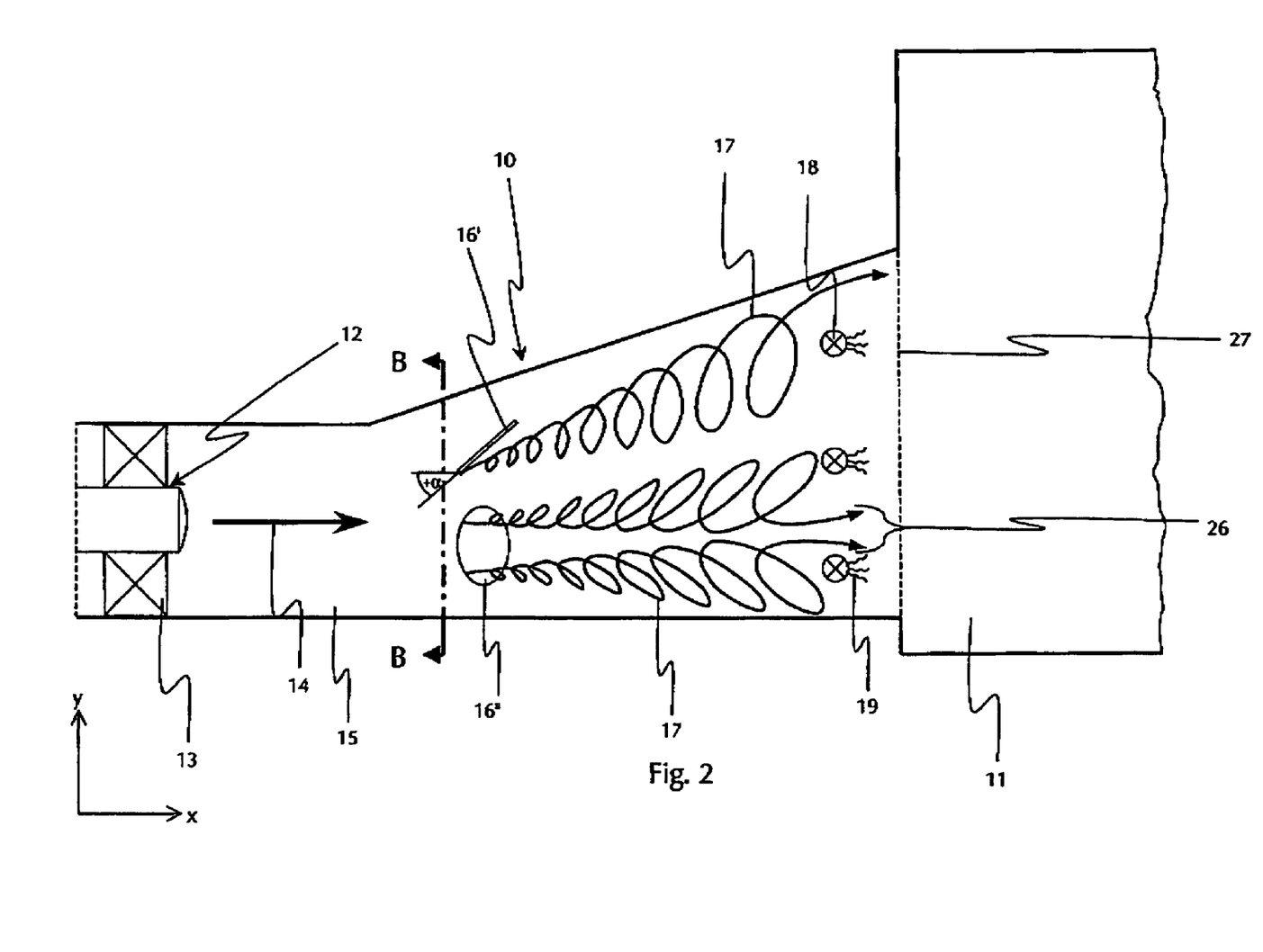
FIG. 2 shows a side view of a further exhaust gas guide.

FIG. 2 shows a further exhaust gas guide 10, in which the flow cross-section of the flow channel 15 only expands toward the upper side in the main flow direction 14. The lower wall runs from the gas turbine 12 up to the waste heat vessel 11 in the x direction. Two swirl disks 16' and 16" lying one above another in the y direction are situated on the upstream part of the diverging section of the flow channel 15. These swirl disks 16' and 16" are angled in relation to the main flow direction 14 exactly like their counterparts from FIG. 1. The swirl disk 16' is oriented in such a way that the leading edge swirls 17 generated thereby, like their counterparts from FIG. 1, are applied continually to the expanding flow channel wall, so that the flow is not carried away by the expanding cross-section of the flow channel 15. These leading edge swirls 17 of the swirl disk 16' mix, in interaction with the leading edge swirl system 26 generated by the swirl disk 16", the exhaust gas flow with the hot exhaust gas streams 19 of the burners 18 and ensure uniform distribution of the exhaust gas flow over the flow cross-section in the entry area 27 of the waste heat vessel 11.

Figure 3:
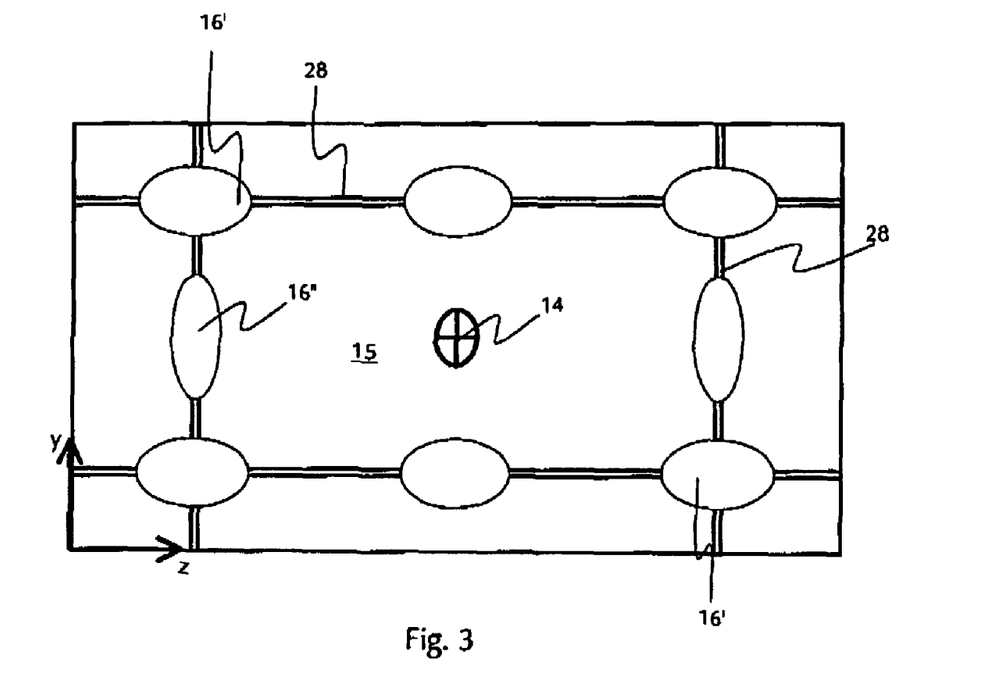
FIG. 3 shows section A-A indicated in FIG. 1.
Figure 4:
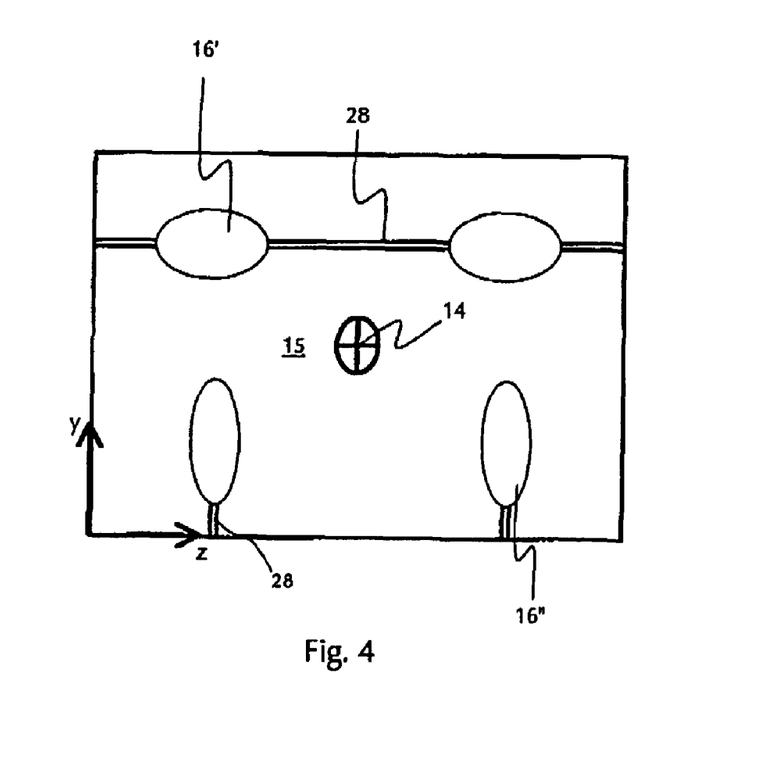
FIG. 4 shows section B-B indicated in FIG. 2.

FIG. 3 shows section A-A from FIG. 1 and FIG. 4 shows section B-B from FIG. 2. FIGS. 3 and 4 thus each show a cross-section of the flow channel 15, so that the main flow direction 14 runs into the plane of the drawing.

Two rows lying one on top of another, each having three swirl disks 16' situated neighboring one another, are provided in the z direction in the flow channel 15 from FIG. 3. Two swirl disks 16" situated neighboring one another are situated in the y direction between these two rows. The two rows of the swirl disks 16' running in the z direction are each attached to an attachment pipe 28, which runs in the z direction from one channel side to the other, and to which all three swirl disks 16' of a row are attached. The swirl disks 16" are each attached to separate attachment pipes 28 which run in the y direction from the upper edge of the flow channel 15 down to its lower edge. The swirl disks 16', 16" are each permanently attached to the attachment pipe 28 so that the angle of attack of the swirl disks 16', 16" is changeable by rotating the attachment pipe 28. The attachment pipes 28 are implemented in such a way that they are rotatable from outside the flow channel 15. Since the swirl disks 16' situated neighboring one another in the z direction are jointly mounted on an attachment pipe 28, these may also only be adjusted jointly. In contrast, the swirl disks 16" are each attached to a separate attachment pipe 28 and their angles of attack may thus be adjusted individually.

It may be seen in FIG. 4 that two swirl disks 16' and two swirl disks 16" are situated neighboring one another in each case in the z direction. The swirl disks 16' are also attached to a joint attachment pipe 28 here, while in contrast the swirl disks 16" are each mounted on a separate attachment pipe 28. The attachment pipes 28 of the swirl disks 16" do not run from top to bottom once through the complete flow channel 15, however, in contrast to those FIG. 3. Instead, these attachment pipes 28 are attached to the lower channel edge and run in the y direction into the flow channel 15 up to the height of the swirl disks 16", where they end.

Figure 5:
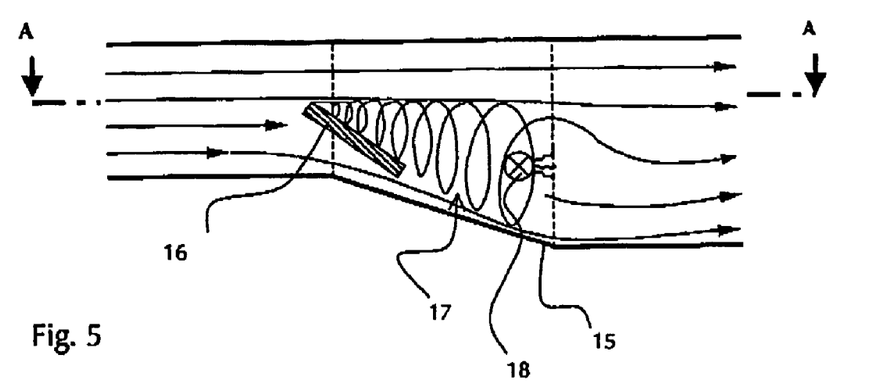
FIG. 5 shows section B-B through a further exhaust gas guide.
Figure 6:
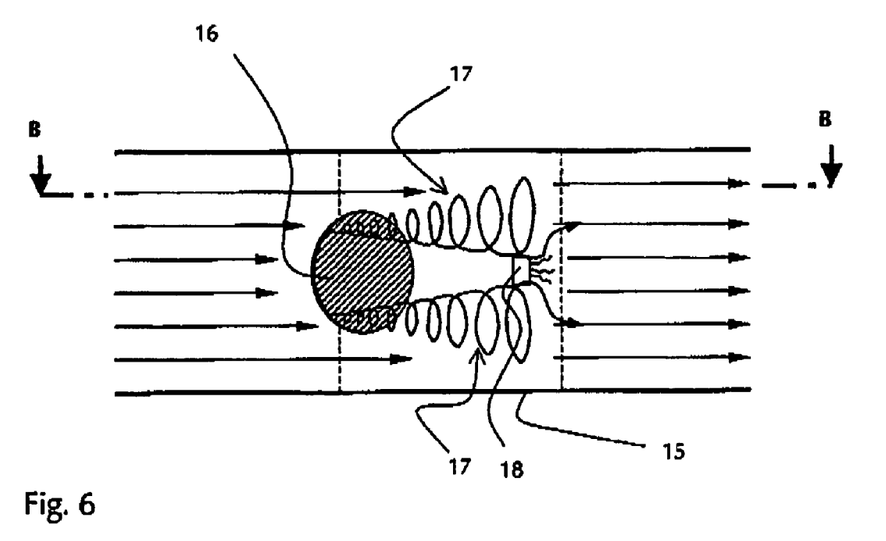
FIG. 6 shows section A-A through the exhaust gas guide shown in FIG. 5.

The mode of operation of the installed parts 16 generating the leading edge swirls are shown once again in FIGS. 5 and 6 in a further exemplary embodiment 10 of the exhaust gas channel according to the present invention, arrow-shaped flow lines being drawn in the flow channel 15 to illustrate the exhaust gas flow. As may be seen from FIG. 5, the exhaust gas flow first flows undisturbed toward the installed surface 16. Since this is only inclined slightly toward the exhaust gas flow, there is almost no backup in front of the installed surface 16. Leading edge swirls 17 expanding in a bag shape form on the top of the installed surface 16 facing away from the exhaust gas flow, which are applied to the expanding channel wall 15 in the area behind the installed surface 16. Thus, in contrast to typical installed parts which back up the exhaust gas flow, the installed surface 16 acts in the flow direction and not against the flow direction. It may also be seen from the top view in FIG. 6 that the swirls 17 form in pairs in the forward area of the installed surface 16, so that they curl inward in opposite directions from the side edges of the installed surface 16. A burner 18 is against situated behind the installed surface 16 in the active area of the leading edge swirls 17, so that its gas streams mix well with the remaining exhaust gas flow.

Figure 7:
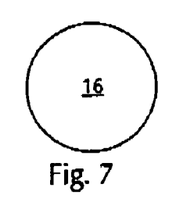
FIG. 7 shows a swirl disk having a circular area.
Figure 8:
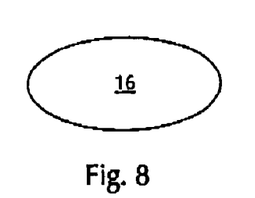
FIG. 8 shows a swirl disk having an ellipsoidal area.
Figures 9, 10:
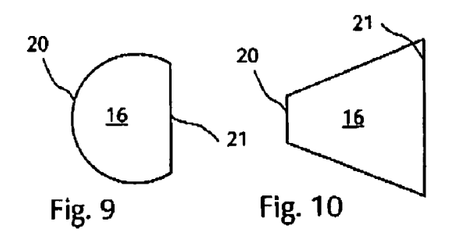
FIG. 9 shows a swirl disk having an area shaped like a circular section.
FIG. 10 shows a swirl disk having a trapezoidal area.
Figure 11:
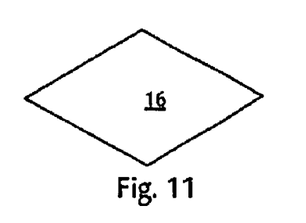
FIG. 11 shows a swirl disk having a rhomboid area.
Figure 12:
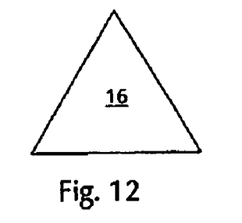
FIG. 12 shows a swirl disk having a triangular area.

Various embodiments of swirl disks 16 are shown in FIGS. 7 through 16. The swirl disk 16 shown in FIG. 7 is a disk having a circular area. The disk shown in FIG. 8 has an elliptical area. The shown in FIG. 9 is also a round swirl disk, which has a flattened rear edge 21, however. The swirl disk 16 is to be situated in the flow so that the round front edge 20 opposes the flow and the flattened rear edge 21 faces away from the flow. The swirl disk 16 shown in FIG. 10 has a trapezoidal area, the narrower front edge 20 opposing the flow and the broader rear edge 21 facing away from the flow. The swirl disk 16 shown in FIG. 10 thus has flow around it from the left to the right like the swirl disk 16 shown in FIG. 9. The disk shown in FIG. 11 has a rhomboid area and the disk shown in FIG. 12 has a triangular area.

Figure 13:
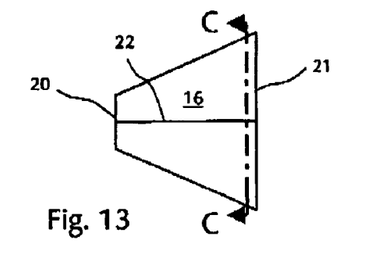
FIG. 13 shows a swirl disk having a trapezoidal area and a longitudinal crease.
Figure 14:
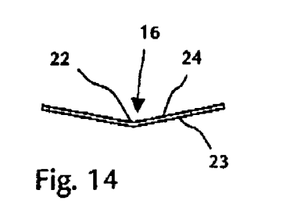
FIG. 14 shows section C-C indicated in FIG. 11.

A further embodiment of a trapezoidal swirl disk 16 is shown in FIGS. 13 and 14. The swirl disk 16 has a crease 22 here, which extends in the flow direction in the middle of the area of the swirl disk 16 from the narrower leading edge 20 up to the broader rear edge 21. The crease 22 runs, as may be seen in FIG. 14, in which section C-C indicated in FIG. 13 is shown, in such a way that the side 23 facing toward the flow (the windward side) of the swirl disk 16 drops downward somewhat in the flow side direction, while the upper side 24 facing away from the flow (the lee side) of the swirl disk 16 is shaped hollow. This shaping results in strengthening of the leading edge swirls and mechanical stabilization of the swirl disk 16.

Figure 15:
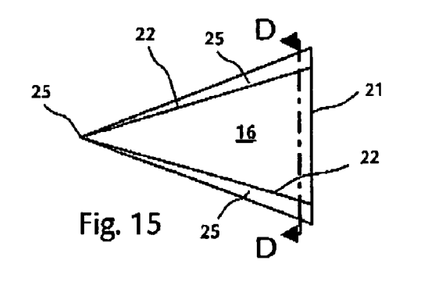
FIG. 15 shows a swirl disk having a triangular area and angled edges.
Figure 16:
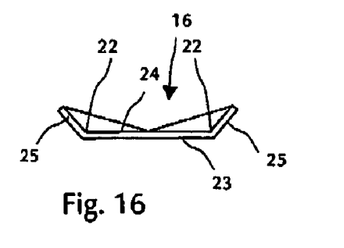
FIG. 16 shows section D-D indicated in FIG. 13.

A further embodiment of a swirl disk 16 is shown in FIGS. 15 and 16, which has a triangular area in the top view. In addition, two creases 22 are provided, which run from the tip 25 of the swirl disk 16 radially to its rear edge 21. Section D-D indicated in FIG. 15 is shown in FIG. 16. The two sides 27 separated from the area by the creases 22 are angled. The swirl disk 16 from FIGS. 15 and 16 is oriented in the flow precisely like the swirl disk 16 from FIGS. 13 and 14. The surface 23 of the swirl disk 16 which has flow against it is thus angled in relation to the flow on its side edges, while the middle area is shaped flat. The upper side 24 of the swirl disk 16 facing away from the flow is thus again shaped hollow.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. An exhaust gas guide of a gas turbine, which is situated between the gas turbine and a downstream waste heat boiler and which comprises a flow channel, which has a cross-section expanding in at least some areas in the main flow direction of the exhaust gas, having installed surfaces influencing the flow,
   wherein the installed surfaces are a swirl device generating leading edge swirls, which is situated in the diverging area of the flow channel and is implemented to distribute the exhaust gas flow uniformly over the flow cross-sectional area upon entry into the waste heat boiler, and
   wherein at least one burner is situated in the diverging area of the flow channel for generating hot exhaust gas streams and the swirl device is further implemented and oriented in such a way that the leading edge swirls generated are configured to mix the hot exhaust gas streams of the at least one burner with the remaining exhaust gas within a distance defined by the flow channel before the exhaust gas flows into the waste heat boiler.

2. The exhaust gas guide according to claim 1,
   wherein the swirl device is situated upstream from at least one burner in the main flow direction of the exhaust gas.

3. The exhaust gas guide according to claim 2,
   wherein the at least one burner is situated in the area behind a face edge of the swirl device.

4. The exhaust gas guide according to claim 3,
   wherein multiple burners are provided, the swirl device being implemented to mix the hot exhaust gas streams of all burners with the remaining exhaust gas.

5. The exhaust gas guide according to claim 2,
   wherein multiple burners are provided, and the swirl device being implemented to mix the hot exhaust gas streams of all burners with the remaining exhaust gas.

6. The exhaust gas guide according to claim 1,
   wherein the multiple burners are provided, the swirl device being implemented to mix the hot exhaust gas streams of all burners with the remaining exhaust gas.

7. The exhaust gas guide according to claim 1,
   wherein the swirl device is implemented in such a way that the exhaust gas flow has a velocity which is essentially uniform over the flow cross-section upon entry into the waste heat boiler.

8. The exhaust gas guide according to claim 1, wherein the exhaust gas flow removed from the gas turbine into the exhaust gas guide having a global twist around the main flow axis, and
   wherein the swirl device is implemented in such a way that the leading edge swirls generated by the swirl device essentially eliminate the global twist of the exhaust gas flow before entry into the waste heat boiler.

9. The exhaust gas guide according to claim 1,
   wherein the swirl device has at least one swirl disk.

10. The exhaust gas guide according to claim 9,
    wherein multiple swirl disks are situated neighboring one another in a flow cross-section.

11. The exhaust gas guide according to claim 10,
    wherein the angle of attack ($\alpha$) of the at least one swirl disk is adjustable in relation to the main flow direction of the exhaust gas.

12. The exhaust gas guide according to claim 9,
    wherein multiple swirl disks are situated in a cascade in the main flow direction of the exhaust gas.

13. The exhaust gas guide according to claim 12,
    wherein the angle of attack ($\alpha$) of the at least one swirl disk is adjustable in relation to the main flow direction of the exhaust gas.

14. The exhaust gas guide according to claim 9,
    wherein the angle of attack ($\alpha$) of the at least one swirl disk is adjustable in relation to the main flow direction of the exhaust gas.

15. The exhaust gas guide according to claim 1, wherein the exhaust gas supplied to the exhaust gas guide is connected via a gas diverter into the downstream waste heat boiler, wherein the swirl device which is situated in the diverging area of the flow channel of the exhaust guide is implemented to distribute the exhaust gas flow uniformly over the flow cross-sectional area upon entry into the gas diverter and wherein the swirl device is further situated and oriented in such a way that the hot exhaust gas streams of the at least one burner which is also situated in diverging area of the flow channel are mixed with the remaining exhaust gas over a distance relatively shorter than a length of the flow channel before the exhaust gas flows into the gas diverter.

* * * * *